United States Patent
Jun et al.

(10) Patent No.: US 8,588,823 B2
(45) Date of Patent: *Nov. 19, 2013

(54) SYSTEM AND METHOD FOR PROVIDING LOCATION INFORMATION SERVICE USING MOBILE CODE

(71) Applicant: Samsung Electronics Co., Ltd., Gyeonggi-do (KR)

(72) Inventors: Hae-Young Jun, Gyeonggi-do (KR); Seok-Hoon Choi, Gyeonggi-do (KR); Ji-Hye Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,510

(22) Filed: Jan. 4, 2013

(65) Prior Publication Data
US 2013/0122942 A1    May 16, 2013

Related U.S. Application Data

(63) Continuation of application No. 12/557,093, filed on Sep. 10, 2009, now Pat. No. 8,374,626.

(51) Int. Cl.
*H04W 24/00* (2009.01)
(52) U.S. Cl.
USPC ............ 455/457; 455/465.5; 455/456.3; 455/456.36; 455/456.1

(58) Field of Classification Search
USPC ............ 455/465.5, 456.3, 456.36, 456.1; 235/462.08, 377, 462.46, 385, 462.16
See application file for complete search history.

(56) References Cited

U.S. PATENT DOCUMENTS

| | | | |
|---|---|---|---|
| 4,948,955 A | 8/1990 | Lee et al. | |
| 6,091,956 A | 7/2000 | Hollenberg | |
| 7,262,685 B2 | 8/2007 | Bastian | |
| 7,681,796 B2 | 3/2010 | Cato et al. | |
| 2007/0145113 A1 | 6/2007 | Keller et al. | |
| 2008/0103850 A1 | 5/2008 | Shen | |
| 2008/0142599 A1 | 6/2008 | Benillouche | |
| 2009/0289843 A1 | 11/2009 | Jayasinghe | |
| 2009/0318168 A1 | 12/2009 | Khosravy et al. | |
| 2010/0130236 A1 | 5/2010 | Sivadas et al. | |
| 2010/0151842 A1 | 6/2010 | De Vries | |
| 2010/0273509 A1 | 10/2010 | Sweeney et al. | |

*Primary Examiner* — Joseph Arevalo
(74) *Attorney, Agent, or Firm* — The Farrell Law Firm, P.C.

(57) ABSTRACT

An apparatus and method for providing a location information service using a mobile code in a Mobile Station (MS) are provided. The method includes obtaining a mobile code scanned by an input device of the MS; acquiring location information if the location information is included in the obtained mobile code; matching coordinates of the acquired location information on a first cyber map in the MS if cyber map information corresponding to the coordinates of the acquired location information is included in the first cyber map in the MS; and if the cyber map information corresponding to the coordinates of the acquired location information is not included in the first cyber map in the MS, updating the first cyber map with cyber map information corresponding to coordinates of corresponding location information obtained from a second cyber map in a server and matching the acquired location information on the updated first cyber map.

16 Claims, 4 Drawing Sheets

SYSTEM AND METHOD FOR PROVIDING LOCATION INFORMATION SERVICE USING MOBILE CODE

PRIORITY

This application is a Continuation of U.S. application Ser. No. 12/557,093, which was filed in the U.S. Patent and Trademark Office on Sep. 10, 2009, the entire content of which is incorporated herein by reference.

BACKGROUND OF THE INVENTION

1. Field of the Invention

The present invention relates generally to offering a location information service, and more particularly, to a system and method capable of providing location information using mobile codes, without using radio signals for positioning (or position measurement), such as Global Positioning System (GPS) signals.

2. Description of the Related Art

Mobile communication systems have evolved to provide not only voice services but also a variety of additional services differentiated from the voice services. Profits of communication service providers that provide only the voice services have already been limited by market saturation. Therefore, the communication service providers are seeking new profit opportunities by providing a variety of additional services differentiated from the voice services, such as, Location Based Service (LBS) services, which are based on location information of Mobile Stations (MSs). LBS services provide user-requested additional application services by combining location information of moving users or vehicles with a variety of other information in real time. Therefore, acquisition of the location information is one of the important factors in providing the LBS services. Originally, LBS services were used by large distribution companies to track their vehicles and their freights. Recently, however, LBS services are being extended to include services for the general public, such as Find-a-Person, Real-Time Traffic Information, Weather Information at a user's current location, etc.

The location information is the contents of locations of actual geographical features and objects on the surface of the earth, which are represented using a predetermined method such as a Global Positioning System (GPS) scheme and a network scheme that provides location information of MSs. In the GPS scheme, a radio navigation system for measuring accurate positions, velocities and times of objects on the surface of the earth using satellites, measures arrival times of waves by receiving satellite signals transmitted from the satellites, and calculates locations of users based on the measured times. The network scheme provides location information of MSs using Base Stations (BSs) and/or Relay Stations (RSs) in Code Division Multiple Access (CDMA) communication systems or Global System for Mobile communication (GSM) communication systems.

FIG. 1 is a diagram illustrating an example of providing an LBS service by acquiring location information using the conventional GPS scheme and the conventional network scheme.

Referring to FIG. 1, in order to acquire desired location information, an MS with a built-in GPS module can determine a distance between satellites and its user by calculating arrival times of signals transmitted from the satellites, and an MS without a built-in GPS module can provide an LBS service based upon the Cell Identifications (Cell-IDs) of cells managed by BSs or RSs currently serving the MS. In order to acquire more detailed and precise location information, triangulation may be performed using signals transmitted from three or more BSs or RSs.

However, the GPS-based and network-based location schemes can only provide limited personal location information. GPS-based location information can be precisely calculated, but this precise information is limited to MSs with a GPS function, which requires GPS hardware. Further, the GPS scheme is unavailable within in a room or a building. In addition, because an accuracy of the network-based location information falls within several hundred meters through several kilometers due to a difference between a user and BSs or RSs in terms of the time and radio signals, accurate location information of the user or a service such as path guidance cannot be provided, and therefore, accuracy of the network scheme is subject to significant changes depending on the location of the user.

Therefore, there is a need for a technology capable of providing location information services by extracting precise location information without using measurement values calculated by radio signals for position measurement.

SUMMARY OF THE INVENTION

An aspect of the present invention is to address at least the above-mentioned problems and/or disadvantages and to provide at least the advantages described below. Accordingly, an aspect of the present invention provides an apparatus and method capable of precisely detecting location information of a user, without using measurement values determined by radio signals such as GPS signals or network signals.

According to one aspect of the present invention, there is provided a method for providing a location information service using a mobile code in a Mobile Station (MS). The method includes obtaining a mobile code scanned by an input device of the MS; acquiring location information if the location information is included in the obtained mobile code; matching coordinates of the acquired location information on a first cyber map in the MS if cyber map information corresponding to the coordinates of the acquired location information is included in the first cyber map in the MS; and if the cyber map information corresponding to the coordinates of the acquired location information is not included in the first cyber map in the MS, updating the first cyber map with cyber map information corresponding to coordinates of corresponding location information obtained from a second cyber map in a server and matching the acquired location information on the updated first cyber map.

According to another aspect of the present invention, there is provided an apparatus for providing a location information service using a mobile code. The apparatus includes a code reading module for obtaining a mobile code scanned by an input device of the MS; a code decoding module for acquiring location information if the location information is included in the obtained mobile code; and a location management module for matching coordinates of the acquired location information on a first cyber map in the MS if cyber map information corresponding to the coordinates of the acquired location information is included in the first cyber map in the MS, wherein if the cyber map information corresponding to the coordinates of the acquired location information is not included in the first cyber map in the MS, the location management module updates the first cyber map with cyber map information corresponding to coordinates of corresponding location information obtained from a second cyber map in a server and matching the acquired location information on the updated first cyber map.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS
OF THE PRESENT INVENTION

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
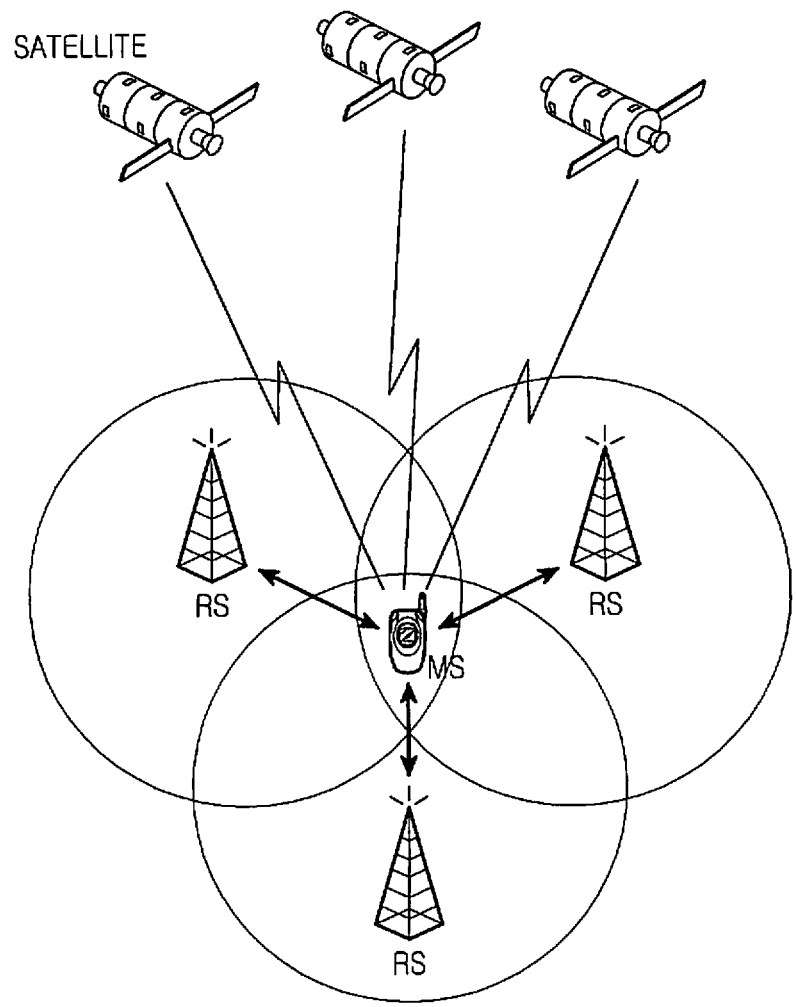
FIG. 1 illustrates an example of providing an LBS service by acquiring location information using the conventional GPS scheme and network scheme.
Figure 2:
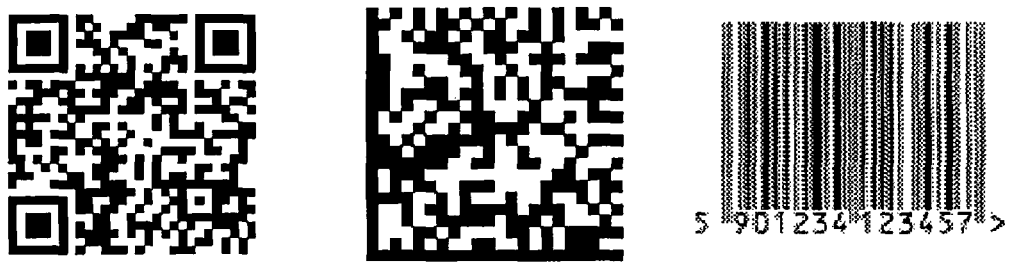
FIG. 2 illustrates examples different types of mobile codes to which the present invention is applicable.

FIG. 2 illustrates examples of different types of mobile codes to which the present invention is applicable. A mobile code includes specific information therein, or includes Uniform Resource Identifier (URI) information to facilitate an access to a specific service. After scanning the mobile code having such information with an input device such as a digital camera or a code reader, a user may extract the information and display the extracted information, or may access the extracted URI and received information provided at the URI.

For example, if a user desires to purchase goods, the user may use an input device to scan a mobile code that stores detailed information on the goods and an address of a web site where the user can purchase the goods. Thereafter, the user may check the information about the goods in the connected web site, and may further decide purchase to the goods.

Such a mobile code can be used mainly for web download, Short Message Service (SMS)/E-mail transfer, automatic dialing, business cards, etc. For example, when a user is interested in purchasing goods, the user may scan, using an input device, a mobile code that stores detailed information about the goods and a URI of a web site where the user can purchase the goods. Thereafter, the user may check the information about the goods in the connected web site, and may further decide to purchase the goods. For example, if a user uses an MS to scan a mobile code that is printed on a business card of a certain person and stores a phone number and an E-mail address of the certain person, the MS may automatically dial the phone number or send an E-mail to the person. In addition, by storing an identifier including location information in the mobile code, which can store a variety of information, it is possible to provide location information of an object associated with the mobile code.

Figure 3:
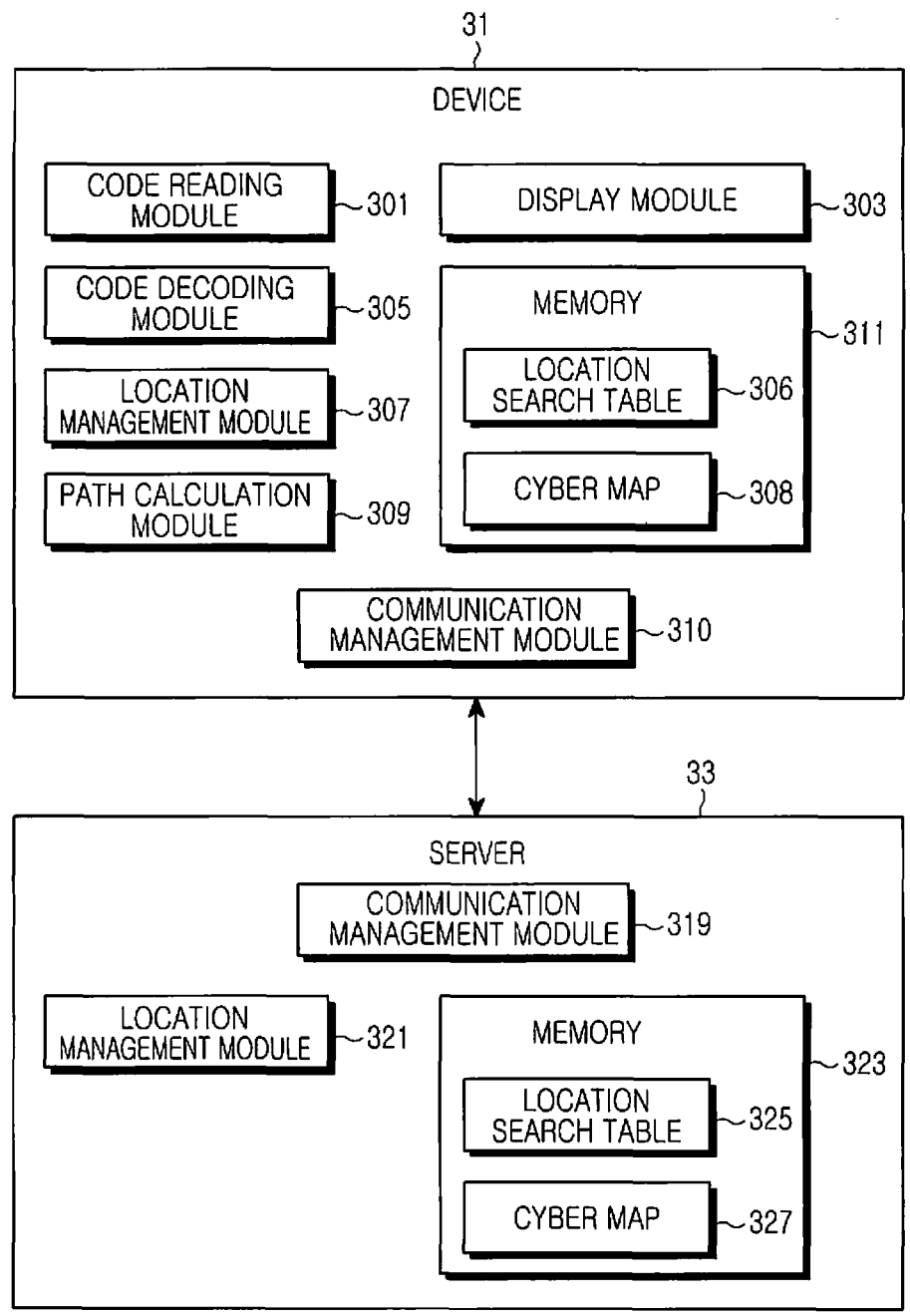
FIG. 3 illustrates internal structures of a device for detecting location information and a server according to an embodiment of the present invention.

FIG. 3 illustrates internal structures of a device for detecting location information and a server according to an embodiment of the present invention, in which the device may correspond to an MS and the server may correspond to a BS that communicates with the MS.

Referring to FIG. 3, a device 31 for detecting location information according to an embodiment of the present invention includes a code reading module 301, a code decoding module 305, a location management module 307, a path calculation module 309, a memory 311, a display module 303, and a communication management module 310. The memory 311 includes a location search table 306 and a cyber map 308.

In the device 31, the code reading module 301 reads a mobile code from the exterior. A code reader may be used to read a one-Dimensional (1D) code, while a digital camera module generally mounted in an MS may be used to read a two-Dimensional (2D) code. The code decoding module 305 extracts text and number information stored in the read code provided from the code reading module 301. The code decoding module 305 can extract an identifier or information including numbers, text, etc. from the read mobile code, and may directly extract location information, if location information is stored in the mobile code. The location management module 307, a module for acquiring actual location information using the identifier acquired from the mobile code, acquires the actual location information in cooperation with the location search table 306 and the cyber map 308 in the memory 311.

The path calculation module 309 calculates a path between two points when the user's current location information and destination location information are mapped on the cyber map 308. The location search table 306 is a module for mapping locations corresponding to identifiers of acquired mobile codes, and if locations corresponding to acquired mobile codes are not stored in the device 31, the device 31 can receive, from a network server 33, a location search table 325 stored in the network server 33. The display module 303 displays information of the device 31 for the user, and the communication management module 310 connects with the server 33 to facilitate transmission/reception of necessary information when communication is performed between the device 31 and the server 33.

In the server 33, a communication management module 319 connects with the device 31 to enable transmission/reception of necessary information when the server 33 communicates with the device 31. A location management module 321 acquires actual location information using an identifier acquired from a mobile code when a location information request message is received from the device 31. The location management module 321 acquires actual location information in association with the location search table 325 and a cyber map 327 in a memory 323. The memory 323 in the server 33, which performs similar functions as the memory 311, transmits, to the device 31, location information corresponding to an identifier the user desires to locate, when the location information for the desired identifier does not exist in the memory 311 of the device 31. A procedure for providing location information using the above structures will be described below.

Figure 4:
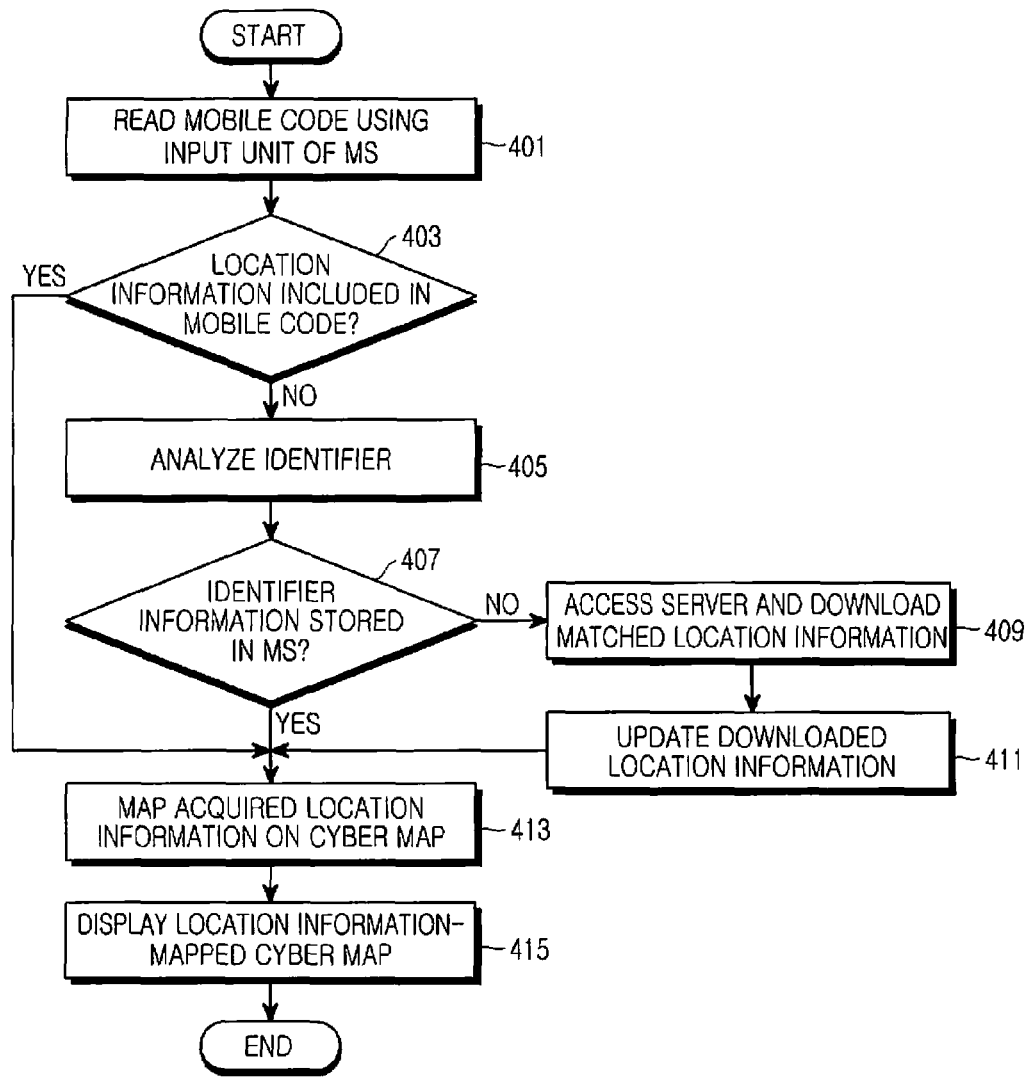
FIG. 4 illustrates a procedure for providing location information using mobile codes according to an embodiment of the present invention.

FIG. 4 illustrates a procedure for providing location information using mobile codes according to an embodiment of the present invention.

Referring to FIG. 4, in step 401, an input device of an MS reads a mobile code to acquire desired location information.

The input device of the MS can be a camera module mounted in the MS, a code reader that exclusively reads mobile codes, or another similar device.

Using the mobile code read in step 401, the MS determines whether desired location information or an identifier from which the location information can be acquired is stored in the mobile code read by the MS, in step 403. If location information of a specific location or building corresponding to the read mobile code, in addition to the identifier, is stored in the mobile code, the MS directly proceeds to step 413 without detecting location information using the identifier, according to a selection of the user. In step 413, the MS can acquire location information by mapping the location information on a cyber map in the MS. However, if only the identifier, but not the location information, is stored in the read mobile code, or if the user selects the identifier, the MS acquires identifier information by analyzing the stored identifier in step 405.

In step 407, is the MS determines whether the identifier information of the mobile code, which is analyzed in step 405, is information included in a location search table of the MS. For example, information on a specific point, building, or shop corresponding to the identifier information is acquired, and is the MS determines whether the acquired information is information included in the location search table of the MS. If the identifier information is included in the location search table of the MS, exact location information corresponding to the location of the identifier can be acquired by detecting accurate location information from the location search table. The location information can be represented by predefined horizontal and vertical distances from a specific place and/or by the floor of the building. Further, the moving distance and coordinate information can be represented in the location information by using information such as a latitude, a longitude, and an altitude.

If the identifier information is not included in the location search table of the MS, the MS accesses a server and downloads data corresponding to the location information of the identifier from a location search table in the server in step 409. Thereafter, in step 411, the MS can acquire accurate location information corresponding to the current location of the identifier by updating the data downloaded from the server in its location search table.

The acquired location information is mapped on the cyber map in the MS and displayed in steps 413 and 415. If the map information corresponding to the acquired location information is also not stored in the MS, the MS may access the server, download map information corresponding to the location information from a cyber map in the server, update the cyber map of the MS using the downloaded map information, and display the updated cyber map after mapping.

The user can acquire location information from the current location to the destination by calculating a moving distance and a path by using the destination location information and the current location information determined through the above process.

In this manner, the MS can be provided with information on a location the user desires to find, through the process of FIG. 4, without using values determined by measuring radio signals for position measurement, such as GPS signals or network signals. The user of the MS can find the desired location in various ways using such location information. This will be described below by way of example only.

If the user's current location is already known, the user can go to the destination by using the MS to analyze an identifier of a mobile code from which location information of the destination can be obtained. The identifier stored in the mobile code is used to obtain location information of the destination as described in FIG. 4, and the location information can be represented by a latitude, a longitude, an altitude, and/or other predefined information on the cyber map, which represents a pertinent place. For example, the location information can be represented by a distance from a well-known building and the floor of the building. For the goods that a user desires to purchase, additional information representing features of the goods and an identifier from which displayed location information can be obtained are stored in a mobile code corresponding to the goods, so that the user can selectively check the additional information and the displayed location information from the identifier stored in the mobile code using the MS. The user can conveniently move to the place where the goods are displayed, based on the displayed location information included in the identifier in accordance with the method illustrated in FIG. 4.

However, when the user does not have information about the place where he is presently located, the user should first check location information of the current place, and then search for a path by finding location information of the destination. This function can be very convenient in congested shopping malls. For example, upon acquiring information that the goods the user wants is in a department A of a specific shopping mall, the user goes to the shopping mall and uses the MS to read a mobile code corresponding to the department A. As mobile codes corresponding to respective departments are generally printed on a guide map at the entrance of the shopping mall, the user can easily find a mobile code for the desired department. The MS can acquire location information of the destination as described in FIG. 4 by reading the mobile code for the department A and analyzing an identifier from the mobile code of the department A, from which the location information can be obtained. Next, the user can instruct the MS to store, as the current location information, the location information acquired by analyzing an identifier of a mobile code for the nearest department, calculate a path to the destination, and go to the department A.

Also, the MS may acquire destination information from an identifier of specific goods in a shopping mall, acquire the current location information by reading a mobile code of another goods displayed around the user, and re-calculate the path, thereby enabling the user to go to the department where the specific goods are displayed.

If the user wants to determine whether he is on the right path to the destination, the user can use the MS to re-acquire the current location information using an identifier of a mobile code for the goods displayed around the user or in a nearby department, re-calculate the path. Then, the user can continue towards the desired destination.

As is apparent from the foregoing description, according to embodiments of the present invention, an MS can acquire desired location information using an identifier of a mobile code. Even when a user wants additional information apart from location information of a specific building or goods, the MS can transmit information on an identifier of a mobile code for the building or goods to a server along with a request for the additional information desired by the user, and receive data corresponding to the desired additional information from the server, thereby acquiring the additional information.

In conclusion, an MS with a recognition device such as a digital camera can acquire precise current location information by providing a personal navigation service without using measurement values determined by radio signals such as GPS signals or network signals.

While a system and method for providing a location information service using a mobile code has been shown and described with reference to a certain embodiments thereof, it will be understood by those skilled in the art that various changes in form and details may be made therein without departing from the spirit and scope of the invention as defined by the appended claims and their equivalents.

What is claimed is:

1. A method for providing a location information service using a mobile code in a Mobile Station (MS), comprising:
   obtaining a mobile code scanned by an input device of the MS;
   acquiring location information if the location information is included in the obtained mobile code;
   matching coordinates of the acquired location information on a first cyber map in the MS if cyber map information corresponding to the coordinates of the acquired location information is included in the first cyber map in the MS; and
   updating, if the cyber map information corresponding to the coordinates of the acquired location information is not included in the first cyber map in the MS, the first cyber map with cyber map information corresponding to coordinates of corresponding location information obtained from a second cyber map in a server and matching the acquired location information on the updated first cyber map,
   wherein the location information included in the obtained mobile code is in the form of a text or a picture.

2. The method of claim 1, further comprises:
   extracting identifier information from the obtained mobile code if the location information is not included in the obtained mobile code;
   determining whether the extracted identifier information corresponds to other information that was stored in the MS; and
   acquiring, upon a determination that the identifier information corresponds to the other information stored in the MS, location information indicating a location associated with the mobile code according to the other information stored in the MS corresponding to the identifier information.

3. The method of claim 2, wherein determining whether the extracted identifier information corresponds to the other information that was stored in the MS comprises determining whether the identifier information is included in a location search table of the MS, and
   wherein acquiring the location information comprises:
   upon a determination that the location information is included in the location search table of the MS, acquiring the location information of the identifier information to match the identifier information on the first cyber map in the MS, when the identifier information is included in the location search table of the MS, and
   upon a determination that the identifier is not included in the location search table of the MS, transmitting the identifier information to the server and acquiring the location information by downloading location information corresponding to the identifier information from the server.

4. The method of claim 3, further comprising:
   sending the identifier information to the server along with a request for additional information corresponding to the identifier information; and
   acquiring the additional information from the server.

5. The method of claim 1, further comprises:
   displaying the matched first cyber map on an output device of the MS; and
   calculating a moving distance and a path using at least one location corresponding to the acquired location information.

6. The method of claim 5, wherein calculating the moving distance and the path comprises:
   calculating the moving distance and the path using the at least one location corresponding to the acquired location information using a path calculation module in the MS; and
   displaying the calculated moving distance and the calculated path on the first cyber map.

7. The method of claim 1, further comprising:
   when information representing a current location is to be updated while the mobile terminal searches for a location along a path displayed on the MS, scanning a mobile code of a nearest building or goods and setting location information acquired using an identifier included in the mobile code as the current location information; and
   re-calculating the moving distance and the path using the set current location information and previously stored destination location information.

8. The method of claim 1, wherein the location information included in the obtained mobile code includes a latitude, a longitude, and an altitude, which represent a desired location.

9. An apparatus for providing a location information service using a mobile code in a Mobile Station (MS), comprising:
   a code reading module for obtaining a mobile code scanned by an input device of the MS;
   a code decoding module for acquiring location information if the location information is included in the obtained mobile code; and
   a location management module for matching coordinates of the acquired location information on a first cyber map in the MS if cyber map information corresponding to the coordinates of the acquired location information is included in the first cyber map in the MS,
   wherein if the cyber map information corresponding to the coordinates of the acquired location information is not included in the first cyber map in the MS, the location management module updates the first cyber map with cyber map information corresponding to coordinates of corresponding location information obtained from a second cyber map in a server and matching the acquired location information on the updated first cyber map,
   wherein the location information included in the obtained mobile code is in the form of a text or a picture.

10. The apparatus of claim 9, wherein the code decoding module extracts identifier information from the obtained mobile code if the location information is not included in the obtained mobile code, and
    the location management module determines whether the extracted identifier information corresponds to other information that was stored in the MS, and acquires, upon a determination that the identifier information corresponds to the other information stored in the MS, location information indicating a location associated with the mobile code according to the other information stored in the MS corresponding to the identifier information.

11. The apparatus of claim 10, wherein the location management module determines whether the identifier information is included in a location search table of the MS, and acquires, upon a determination that the location information is included in the location search table of the MS, the location information of the identifier information to match the identifier information on the first cyber map in the MS, when the identifier information is included in the location search table of the MS, and wherein the location management module transmits, upon a determination that the identifier is not included in the location search table of the MS, the identifier information to the server and acquires the location information by downloading location information corresponding to the identifier information from the server.

12. The apparatus of claim 11, wherein the location management module sends the identifier information to the server along with a request for additional information corresponding to the identifier information, and acquires the additional information from the server.

13. The apparatus of claim 9, further comprising:
a display module for displaying the matched first cyber map on an output device of the MS; and
a path calculation module for calculating a moving distance and a path using at least one location corresponding to the acquired location information.

14. The apparatus of claim 13, wherein the path calculation module calculates the moving distance and the path using the at least one location corresponding to the acquired location information using a path calculation module in the MS, and the display module displays the calculated moving distance and the calculated path on the first cyber map.

15. The apparatus of claim 9, wherein when information representing a current location is to be updated while the mobile terminal searches for a location along a path displayed on the MS, a mobile code of a nearest building or goods is scanned and location information acquired using an identifier included in the mobile code is set as the current location information, and wherein the path calculation module re-calculates the moving distance and the path using the set current location information and previously stored destination location information.

16. The apparatus of claim 9, wherein the location information included in the obtained mobile code includes a latitude, a longitude, and an altitude, which represent a desired location.

\* \* \* \* \*